United States Patent [19]

Ryuzo et al.

[11] Patent Number: 4,546,018

[45] Date of Patent: Oct. 8, 1985

[54] COATING COMPOSITION AND PRIMER

[75] Inventors: Mikami Ryuzo; Katsuyoshi Nakasuji, both of Ichihara, Japan

[73] Assignee: Toray Silicone Co., Ltd., Tokyo, Japan

[21] Appl. No.: 684,183

[22] Filed: Dec. 20, 1984

Related U.S. Application Data

[63] Continuation-in-part of Ser. No. 539,596, Oct. 6, 1983, abandoned, which is a continuation-in-part of Ser. No. 399,606, Jul. 19, 1982, abandoned.

[30] Foreign Application Priority Data

Sep. 21, 1981 [JP] Japan ................................ 56-149107

[51] Int. Cl.$^4$ .............................................. B65B 55/00
[52] U.S. Cl. ............................ 427/407.2; 156/307.5; 156/329; 156/330; 427/299; 427/302; 427/322; 427/327; 427/325; 427/386; 427/387; 427/408; 427/409; 427/410; 428/413; 428/447; 528/17; 528/27; 525/476

[58] Field of Search ................... 156/307.5, 329, 330; 427/299, 302, 322, 327, 325, 387, 386, 408, 409, 410, 407.2; 428/413, 447; 528/17, 27; 525/476

[56] References Cited

U.S. PATENT DOCUMENTS

| | | | |
|---|---|---|---|
| 3,324,080 | 6/1967 | Hicks ...................................... | 528/29 |
| 4,141,926 | 2/1979 | Ariga et al. ......................... | 525/476 |
| 4,233,428 | 11/1980 | Endo .................................... | 156/329 |
| 4,283,513 | 8/1981 | Mikami ............................... | 525/476 |
| 4,287,326 | 9/1981 | Mikami ............................... | 525/476 |

Primary Examiner—Melvyn I. Marquis
Attorney, Agent, or Firm—Robert L. McKellar

[57] ABSTRACT

What is disclosed is a new and novel primer composition comprising a silicone modified epoxy resin and an organotitanium acid ester. These compositions are useful for priming solid substrates to allow the adherence of room temperature cured silicone rubber to the substrate. The compositions are also useful as protective coatings.

21 Claims, No Drawings

COATING COMPOSITION AND PRIMER

This application is a continuation-in-part of patent application Ser. No. 539,596, filed Oct. 6, 1983 now abandoned which was a continuation-in-part of patent application Ser. No. 399,606 filed July 19, 1982 now abandoned.

BACKGROUND OF THE INVENTION

This invention deals with primer and coating compositions. In particular, this invention deals with primer compositions which are used with room temperature curable silicone rubber and room temperature-curable silicone-modified organic rubbers in order to obtain excellent adhesion to a variety of substrates. In particular, it also deals with compositions, similar to the primer compositions, which are useful as coatings on various substrates. The compositions have the ability to be stored over a long period of time in the absence of moisture and they can be cured at room temperature in the presence of moisture. The compositions exhibit excellent adhesiveness with a variety of substrates.

In recent years, due to the superior durability of room temperature-curable silicone rubbers in comparison with other rubbers such as organic rubbers, they have become widely used as sealants in construction. Room temperature curable silicone-modified organic rubbers have recently been introduced and are also being used as sealants in construction. Such construction may employ various substrate materials, for example, metals such as aluminum, steel and stainless steel; aluminum when coated with acrylic resin, urethane resin or epoxy resin; hard inorganic materials such as glass, tile, stone and porous inorganic base materials such as mortar and concrete. Thus, a firm adhesion by the room temperature-curable silicone rubbers and room temperature-curable silicone-modified organic rubbers used as sealants has become an important problem.

A widely used method is the application of various primers to the substrate followed by the application of the room temperature curable silicone rubber or room temperature curable silicone-modified organic rubber. However, several of the above-mentioned substrates are difficult to adhere to, such as, for example, pure aluminum, surface-treated aluminum, stainless steel, aluminum coated with various resins and mortar. As a sealant, the silicone rubber or silicone-modified organic rubber peels off at the interface of the substrate before it deteriorates or loses its elasticity. Thus, primers which would maintain superior adhesive strength for lengthy periods is desired.

Conventionally, primers composed of epoxy resins and organofunctional silanes are well known. However, since the mutual miscibility of epoxy resins and the silane is poor, a durable and uniform adhesive film cannot be obtained.

The inventors discovered the present invention in an attempt to overcome the above-mentioned drawbacks. As a result, it was found that, by using an organotitanium acid ester to cure a silicone-modified epoxy resin which is itself obtained by a reaction between hydroxyl groups on an epoxy resin and the alkoxy groups of a silicone compound, a sturdy and transparent film can be formed. This film has superior adhesive strength when used as a primer for room temperature-curable silicone rubber and room temperature-curable silicone-modified organic rubber.

Thus, one aspect of this invention concerns primer compositions comprising (A) 100 parts by weight of a silicone modified epoxy resin which contains both epoxy groups and silicon-bonded alkoxy groups wherein the modified epoxy resin is obtained by contacting and reacting (a) a compound having the unit formula

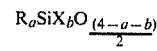

wherein R is a substituted or unsubstituted monovalent hydrocarbon radical, X is an alkoxy radical having the formula R'O— wherein R' is an alkyl radical of 1 to 4 carbon atoms or the radical $R^2OR^3$— wherein $R^2$ is an alkyl radical of 1 to 4 carbon atoms and $R^3$ is a divalent alkylene radical of 1 to 3 carbon atoms; a has a value of 0 to 2; b has a value of 1 to 4 and the sum of a+b has a value of 1 to 4 with (b) an epoxy resin containing at least one epoxy group and at least one hydroxy group per molecule; and (B) 0.1 to 100 parts by weight of an organotitanium acid ester.

Component (A) is a primary component of the primer composition along with component (B).

Taking component (A) first, it should be noted that component (A) is prepared from two subcomponents, components (a) and (b). Component (a) prior to reaction with component (b) consists of a compound having the unit formula

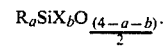

R in component (a) is a substituted or unsubstituted monovalent hydrocarbon radical. The groups which have been found useful in this invention are, for example, alkyl groups such as methyl, ethyl, propyl and octadecyl; alkenyl groups such as vinyl and allyl and aryl groups such as phenyl. The substituted monovalent hydrocarbon radicals useful in this invention are those wherein the above disclosed unsubstituted monovalent hydrocarbon radicals are substituted by such groups as halogen, cyano, mercapto and hydroxyl groups or by organofunctional groups such as methacryloxy, acryloxy or the 3, 4-epoxycyclohexyl groups.

X in the above formula is an alkoxy radical having the formula R'O— wherein R' is an alkyl radical of 1 to 4 carbon atoms or the $R^2OR^3$— radical. Thus, X can be R'O— such as methoxy, ethoxy or propoxy. X can also be $R^2OR^3O$— wherein $R^2$ is an alkyl radical of 1 to 4 carbon atoms and $R^3$ is a divalent alkylene radical of 1 to 3 carbon atoms. $R^2$ can be for example, methyl, ethyl or propyl and $R^3$, for example can be methylene, ethylene or propylene. An example of $R^2OR^3O$— can be, for example, methoxyethoxy—.

For purposes of this invention, a has a value of 0 to 2; b has a value of 1 to 4. Thus, included within the scope of this invention are compounds wherein R is not necessarily present. The reason for the values of a and b as set forth above is that there cannot be too few alkoxy groups in the resulting reacted product from (a) and (b). Components with too few alkoxy groups in the reacted product result in insufficient curing and insufficient adhesion in the final product. Thus, it is preferable that there be at least two X groups in (a) and at least 3 X groups be present in (A). Component (a) can be a silane, a polysiloxane or a siloxane oligomer. Polysiloxanes having a moderate degree of polymerization are preferred for this invention. The polysiloxane may be linear, branched chain or a network siloxane. In addition to the alkoxy radicals, this material can also contain small amounts of hydroxyl groups, halogen groups or hydrogen atoms.

Examples of silanes useful as component (a) are such silanes as methyltrimethoxysilane, dimethyldiethoxysilane, ethyltriethoxysilane, phenyltrimethoxysilane, vinyltrimethoxysilane, vinyltri(methoxyethoxy)silane, allyltripropoxysilane, gamma-methacryloxypropyltrimethoxysilane, gamma-glycidoxy-propyltrimethoxysilane, beta-(3,4-epoxycyclohexyl)ethyltrimethoxysilane, tetramethoxysilane, tetraethoxysilane, tetrapropoxysilane, tetrabutoxysilane, the partial hydrolysis condensation products of any of the preceding compounds and ethyl polysilicate. These compounds may be used individually or by mixing with each other. Based on the reactivity with the hydroxyl groups of the epoxy resin, low molecular weight organoalkoxysilanes such as methyltrimethoxysilane and ethyltrimethoxysilane, are desirable. Also, based on their excellent effect in improving the adhesion with the base material, gamma-mercaptopropyltrimethoxysilane and gamma-glycidoxypropyltrimethoxysilane, are desirable. The epoxy resin (b), the other component of (A), must have at least one hydroxyl group and at least one epoxy group per molecule. Either the bisphenol type epoxy resins or the novolak type of epoxy resins are usable. The bisphenol resins are preferred. In particular, epoxy resins obtained by the condensation of bisphenol A and epichlorohydrin are preferred. These are expressed by the average formula

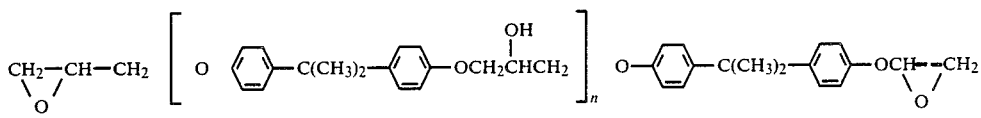

(n is an integer between 1 and 19).

A hydroxyl equivalence in the range of 100 to 220 is desirable. When the hydroxyl equivalence is less than this range, the quantity of component (b) modified by the silicone compound becomes small, resulting in difficulty in the formation of a satisfactory film. When the hydroxyl equivalence is greater than 220, under the ordinary conditions of the condensation reaction of components (a) and (b), unreacted hydroxyl groups tend to remain which may lower the storage stability when the organotitanium acid ester of component (B) is present in (A). Also, in the condensation reaction this will cause problems of increased viscosity and gelation. Furthermore, although the epoxy groups generally do not participate in the condensation reaction with the alkoxy groups of component (a) and hydroxyl groups of component (b), an epoxy equivalence in the range of 180 to 4,000 is desirable in order to increase the adhesive effect of the primer composition. It is preferred that average molecular weight be 300 to 3,000 and particularly 700 to 1,400. Component (A) can be obtained by mixing the above-mentioned components (a) and (b) at a temperature above the boiling point of the by-produced alcohol. The two components condense liberating the alkoxy groups of component (a) and the hydroxyl groups of component (b) as alcohol. Generally, it is easier to carry out this reaction using no catalyst or a small amount of a condensation catalyst at 80° to 160° C. with continuous removal of the liberated alcohol. A solvent or diluent such as toluene, xylene or ethyl acetate may be used during the reaction. It should be noted that after the reaction, no hydroxyl groups should remain on the epoxy resin. For this reason, it is advantageous to use a small amount of a catalyst. During the condensation of components (a) and (b), it is desirable that the reaction be carried out under the conditions wherein the ratio of mols of alkoxy groups in component (a) to the mols of hydroxyl groups in component (b) is 1 or greater. When the reaction is carried out at below 1 and especially when the organotitanium acid ester of component (B) is added to component (A), gelation is easily effected. Thus, in order to obtain a durable, homogeneous liquid primer composition, the reaction should be carried out at the above-mentioned molar ratios. It is preferred that component (A) contain at least 3 alkoxy groups.

Component (B), the organotitanium acid ester, after reacting with the alkoxy groups of component (A), will not only cure the primer composition and provide air dryability, but also will remarkably improve the adhesive strength, especially the adhesive durability, between the substrate and the room temperature-curable silicone rubbers or room temperature-curable silicone-modified organic rubbers. Examples of titanium compounds useful in this invention are as follows: tetraisopropyl titanate, tetra-n-butyl titanate, butyl titanate dimer, tetra(2-ethylhexyl) titanate, diethoxytitanium acetylacetonate, titanium diacetylacetonate, octylene glycol titanate, titanium lactate, titanium ethyl lactate, ethanolamine titanate, titanium chelates such as beta-diketonate chelates of dialkoxytitaniums, ketoacid ester chelates of dialkoxytitaniums or their partial hydrolysis condensation products. Component (B) may be used as individual compounds or mixtures of individual compounds. The amount of Component (B) useful in this invention is 0.1 to 100 parts by weight per 100 parts of component (A). From the viewpoint of curability, adhesion and storage stability, 5 to 25 parts by weight is desirable.

Simple mixing of these components will provide the primer composition of this invention.

Furthermore, in an attempt to improve the adhesion, especially the adhesion durability of the primer, and also to improve the air dryability and thus increase the productivity, the addition of an additional silane or its partial hydrolysis condensation product expressed by the following average formula, is effective:

wherein $R^4$ represents organic groups such as alkyl groups such as methyl and ethyl; monovalent unsaturated aliphatic hydrocarbon groups such as vinyl and methacryloxy and organofunctional groups such as glycidyl and mercaptopropyl; $R^5$ is represented by alkyl groups such as methyl, ethyl and propyl or alkoxyalkyl groups. Several examples of these compounds are methyltrimethoxysilane, dimethyldiethoxy-silane, ethyltriethoxysilane, phenyltrimethoxysilane, vinyltrimethoxysilane, allyltripropoxysilane, gamma-methacryloxypropyltrimethoxysilane, glycidoxypropyltrimethoxysilane, beta-(3,4-epoxycyclohexyl)ethyltrimethoxysilane, tetrapropoxysilane, tetrabutoxysilane and the partial hydrolysis and condensation products of the preceding compounds and ethyl polysilicate. The silane or partial hydrolysis condensation product should be selected according to the intended application of the primer composition.

When applying the primer composition to the substrate and the viscosity is too high or a thin film is desired, it is possible to use an organic solvent for dilution. For example, toluene, xylene or ethyl acetate may be used as the organic solvent. In an attempt to further increase the postcure film strength, various inorganic fillers may be added to the primer compositions, for example, a powdered silica may be added. Other fillers suitable for this purpose are hydrophobic silicas with a trimethylsilylated surface. Moreover, any generally well known heat stabilizer or colorants such as red iron oxide, cerium oxide, fatty acid salts of iron, titanium oxide or other agents may be optionally added provided interference with the purpose of this invention is not caused.

The primer of this invention is suitable for use as a pre-process treatment for substrates in order to increase the adhesion and durability of room temperature-curable silicone rubbers and room temperature-curable silicone-modified organic rubbers with various substrates throughout the curing process. The room temperature-curable silicone rubber may be a single package or two package type. Any type involving liberation of alcohol, oxime, ketone, amine, hydroxylamine or carboxylic acid may be used. The room temperature-curable silicone-modified organic rubbers may also be single or two package types. Examples are as follows: alkoxysilyl-terminated polyether rubbers, alkoxysilyl-terminated polybutadiene rubbers and alkoxysilyl-terminated polyurethane rubbers.

By using these primer compositions as a pre-process treatment for poorly adhering base materials such as pure aluminum, surface-treated aluminum, coated aluminum, stainless steel, mortar and concrete, the above-mentioned rubber can be adhered firmly and durably. The sealing of different substrates in construction can be carried out smoothly.

Materials similar to those discussed above are also appropriate for use as coatings for various substrates. Therefore, this invention also deals with coating compositions. More particularly, this aspect of the invention deals with compositions which can be stored over a long period of time in the absence of moisture but can be cured at room temperature in the presence of moisture as coatings. These compositions exhibit excellent adhesion to various substrates.

Generally, silicones exhibit excellent heat resistance and electrical insulating properties and they have therefore been widely used for heat-resistant paints and varnishes for electrical insulation. However, silicones have some disadvantages. For example, silicones require high temperatures and long term heating for curing. In addition, they can be adhered satisfactorily to metal plates such as soft steel and stainless steel, but they cannot be easily adhered to plastics.

The inventors pursued the present investigation in an attempt to overcome the above-mentioned disadvantages of silicones. It was found that compositions can be obtained which can be stored for long periods of time in the absence of moisture but which can be cured at room temperature in the presence of moisture to form coatings which exhibit excellent adhesiveness with a variety of substrates such as metals and plastics.

This invention therefore deals with coating compositions which consist of a coating composition comprising (I) 100 parts by weight of a silicone modified epoxy resin containing silicon-bonded alkoxy groups wherein the modified epoxy resin is obtained by contacting and reacting a compound (a) containing at least two silicon-bonded alkoxy groups per molecule having the unit formula

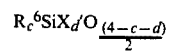

wherein $R^6$ is a substituted or unsubstituted monovalent hydrocarbon radical, $X'$ is an alkoxy radical having the formula $R^7O-$ wherein $R^7$ is an alkyl radical of 1 to 4 carbon atoms or the radical $R^8OR^9-$ wherein $R^8$ is an alkyl radical of 1 to 4 carbon atoms and $R^9$ is divalent alkylene radical of 1 to 3 carbon atoms; c has a value of 0 to 2; d has a value of 1 to 4 and the sum of c+d has a value of 1 to 4, with (b) an epoxy resin containing at least one epoxy group and at least one hydroxyl group per molecule and wherein prior to contacting and reacting components (a) and (b), the ratio of alkoxy groups in component (a) to the hydroxy groups in component (b) is equal to or greater than 1; and (II) 0.1 to 100 parts by weight of an organotitanium compound.

Component I of this invention is prepared from two reactive materials I(a) and I(b). Specifically, Component (I) of the composition is a product of the condensation reaction between the silicon-bonded alkoxy groups in component I(a) and the hydroxyl groups in component I(b). This material is a primary component of the coating compositions of this invention. Component I(a) is a silane or polysiloxane containing at least two silicon-bonded alkoxy groups per molecule and has the unit formula

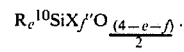

The alkoxy groups undergo a condensation reaction with the hydroxyl groups in the epoxy, component I(b). In the formula, $R^{10}$ represents substituted or unsubstituted monovalent hydrocarbon radicals bonded to silicon atoms. Examples of these groups are alkyl groups such as methyl, ethyl, propyl and octadecyl; alkenyl groups such as vinyl and allyl; aryl groups such as phenyl and naphthyl and their derivatives in which some of the hydrogen atoms are substituted with halogen atoms, cyano groups, hydroxyl groups or mercapto groups or in which some of the hydrogen atoms on alkyl groups are substituted with functional groups such as methacryloxy acryloxy, glycidyl and 3,4-epoxycyclohexyl. $X''$ for purposes of this invention is a silicon-bonded alkoxy group represented by the formula $R^{11}O-$ wherein $R^{11}$ is an alkyl radical of 1 to 4 carbon atoms or the radical $R^{12}OR^{13}-$ wherein $R^{12}$ is an alkyl radical of 1 to 4 carbon atoms and $R^{13}$ is a divalent alkylene radical of 1 to 3 carbon atoms. Examples of these groups are methoxy, ethoxy, propoxy and methoxyethoxy. For purposes of this invention, e has a value of 0 to 2 and f has a value of 1 to 4 and the sum of e+f has a value of 1 to 4. The fact that e has a value of 0 to 2 indicates that $R^{10}$ is not necessarily present in component I(a). However, e must be 2 or less and f must be 1 or more. Each molecule must contain at least two silicon-bonded alkoxy groups. The reason for this is that if the number of alkoxy groups is too low, the degree of condensation with the hydroxyl groups in component I(b) will be decreased and the number of silicon-bonded alkoxy groups in component (I) will be less which results in insufficient curing. In this sense, it is desirable that at least three X' groups be present in component (I) after the reaction of components I (a) and I (b).

Component I(a) can be either a silane or a polysiloxane. If it is a polysiloxane, the degree of polymerization must be 2 or greater. The molecular configuration of the polysiloxane can be linear, branched chain or network. In addition to the reactive alkoxy groups, it can contain small amounts of silicon-bonded hydroxyl groups, halogen atoms or hydrogen atoms. Examples of component I(a) are silanes such as methyltrimethoxysilane, methyltripropoxysilane, dimethyldiethoxysilane, ethyltri-ethoxysilane, phenyltrimethoxysilane, diphenyldimethoxysilane, phenylmethyldiethoxysilane, vinyltrimethoxysilane, allyltripropoxysilane, vinyltri(methoxyethoxy)silane, methylvinyldiethoxysilane, tetramethoxysilane, tetraethoxysilane, gamma-chloropropyltrimethoxysilane, gamma-chloropropylmethyldimethoxysilane, gamma-glycidylpropyltrimethoxysilane, gamma-glycidylpropylmethyldiethoxysilane, beta-(3,4-epoxycyclohexyl)ethyltrimethoxysilane, gamma-methacryloxypropyltrimethoxysilane, gamma-methacryloxypropylmethyldiethoxysilane and gamma-acryloxypropyltrimethoxysilane; partial hydrolysis and condensation products of one or two or more of these silanes; partial hydrolysis and condensation products of these silanes with other organosilanes such as trimethoxyethoxysilane and ethyl polysilicate.

Component I(b) is the same as that used for the primer composition discussed above and is an epoxy resin containing at least one epoxy group and hydroxyl group per molecule. Both bisphenol type resins and novolak type resin are applicable. Component I(b) preferably possesses the following structural formula with a molecular weight ranging from 300 to 6000.

gelation occurring during the reaction becomes less. In addition, the storage stability of the coating composition, when component (II) is added, increases.

The condensation reaction between components I(a) and I(b) is preferably carried out at 80°-250° C. using a small amount of a conventional catalyst such as organotitanium acid esters. When this condensation reaction is carried out, an organic solvent which can dissolve both components I(a) and I(b) can be used. However, the use of an organic solvent is undesirable for some coating applications owing to deterioration of the substrates by the solvent. In such cases the reaction is preferably carried out in the presence of an excess of low boiling alkoxysilane.

Component (II) is a compound which makes component (I) room-temperature curable in the presence of moisture. Examples of such compounds: titanium acid esters of monohydric alcohols such as methanol, ethanol, isopropanol, butanol, cyclohexanol, octanol and octadecyl alcohol; titanium acid esters of dihydric alcohols such as ethylene glycol, propylene glycol, octylene glycol, diethylene glycol, tripropylene glycol and tetraethylene glycol; titanium acid esters of trihydric alcohols such as glycerin; alkoxy titanium chelates such as diisopropoxybis(acetylacetonato)titanium and di-n-butoxybis(triethanolaminato)titanium and dihydroxybis(lactato)titanium.

In terms of the amount of component (II) to be added, the curing rate slows down when the amount of component II is too small. In contrast, if too much is added, the cured film becomes brittle and cracks are easily produced. Thus, an appropriate amount ranges from 0.1 parts by weight to 100 parts by weight per 100 parts by weight of component (I). From a consideration of curability, adhesiveness and storage stability, the amount preferably ranges from 5 to 90 parts by weight.

The coating compositions of this invention can be obtained from components (I) and (II) by simply mixing them together. However, in order to increase the storage stability, both components are preferably mixed together in the absence of moisture and the product is stored in a moisture-impermeable container after mixing and degassing treatments.

Optionally, additional components such as organic solvents, inorganic fillers, pigments and heat-resisting

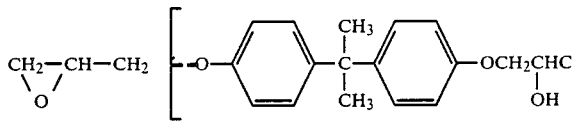 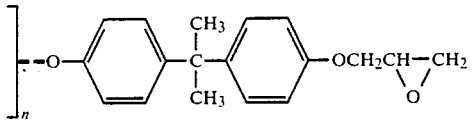

Examples of commercial epoxy resins useful herein are Epikote® 815, 820, 828, 834, 864, 1001, 1004 and 1007, all products of the Shell Chemical Corporation.

Component (I) is a silicone-modified epoxy resin containing silicon-bonded alkoxy groups which is obtained by a condensation reaction between components I(a) and I(b) wherein the ratio of alkoxy groups in component I(a) to the hydroxyl groups in component I(b) is equal to or greater than 1. If this ratio is less than 1, gelation is likely to occur during the condensation reaction between components I(a) and I(b). Although gelation may not occur during the condensation reaction, gelation is likely to occur when the organotitanium compound, component (II), is added thereto and a satisfactory storage stability therefore cannot be achieved. As the above-mentioned ratio increases, the chances of agents can be added. In particular, additional organotrialkoxysilane such as has been disclosed for component I(a) can be added in an amount of 5 to 500 parts by weight per 100 parts by weight of component (II) after components I(a) and I(b) have been reacted and after component II has been added. The organic radicals in the organotrialkoxysilane are identical to the above-mentioned $R^{10}$ radicals and the alkoxy radicals are also identical to the above-mentioned X''. The coating compositions of this invention can be stored over a long period in the absence of moisture. In the presence of moisture, curing occurs even at room temperature to form a strong heat-resistant and weather-resistant film which is firmly adhered on substrates such as various types of metals, plastics and woods. Thus, the compositions are very useful as protective coating agents for these substrates.

Several examples illustrating the invention follow: The viscosity unless indicated otherwise was measured at 25° C.

"Parts" in the examples denotes "parts by weight." The finger touch drying time, adhesiveness and pencil hardness were determined under the following conditions:

Finger touch drying time: the finger touch drying time was defined by the time in which the coated surface ceases to be tacky after being coated on the substrate and a fingerprint no longer imprints on the surface. Pencil hardness: the pencil hardness was measured according to JIS K 5400.

Adhesiveness (Cross-cut adhesion test): one hundred, 1 mm squares, were cut in a 1 cm square of the cured coating using a razor blade and a commercial cellophane tape was firmly pressed and adhered over the cut squares. The number of squares remaining out of 100 squares was counted after the tape had been quickly peeled. The number of remaining squares was recorded as the numerator and the number of cut squares was recorded as the denominator.

EXAMPLE 1

(A) Synthesis of a partial hydrolysis condensation product of methyltrimethoxysilane 136 g (1 mol) methyltrimethoxysilane and 18 g (1 mol) water and 0.1 g acetic acid were placed in a 300 ml three-neck flask equipped with reflux condenser, stirrer and thermometer. A reaction was carried out for 5 hours at reflux. The reaction by-product, methyl alcohol, and unreacted methyltrimethoxysilane were then removed under vacuum at 10 mm Hg and 150° C. to give a liquid polysiloxane containing 30 wt % methoxy groups with a viscosity of 0.000046 $m^2/s$.

(B) Synthesis of a silicone-modified epoxy resin 700 g of an epoxy resin (Epikote 1001, Shell Chemical Co.) with an average molecular weight of 900 to 1000, hydroxyl equivalence of 115 and epoxy equivalence of 500; 300 g of the partial hydrolysis condensation product produced in Example 1(A), 1,500 g toluene and 0.15 g tetraisopropyl titanate as catalyst were placed in a 5000 ml three-neck flask equipped with reflux condenser, stirrer and thermometer. With continuous stirring, the flask was heated to 100° C. gradually and a condensation reaction was carried out at reflux (105° to 110° C.). The essentially nontransparent reaction mixture gradually became transparent. During the reaction, samples were taken each hour and applied to a glass plate. The reaction was continued until the film on the glass plate, obtained by evaporating the low boiling substances by baking at 150° C., became transparent. This film became transparent after a reaction of 3 hours. Reflux was continued while the methyl alcohol by-product was continuously removed from the system through distillation. The residue from the reaction was a transparent liquid with a viscosity of 0.00015 $m^2/s$ at 25° containing 37 weight percent nonvolatile components. Gel permeation chromatography and infrared spectroscopy revealed that this nonvolatile component was a silicone-modified epoxy resin containing epoxy groups and silicon-bonded methoxy groups. Infrared spectroscopy and boiling point data showed that the volatile component was toluene.

(C) Adding and mixing 10 g of tetra-n-butyl orthotitanate into 100 g of the product of Example 1(B) gave a uniform transparant liquid (composition C). This composition C was stable, after sealing to exclude moisture, in storage for more than 2 months. The above-mentioned composition C was then applied to 2 each of mortar blocks and aluminum panels (JIS-H4000) with a brush. An aminoxy-liberating two package room temperature-curable silicone rubber (Toray Silicone Co., Ltd. product, SH792 Sealant) was applied to these blocks and panels to form adhesion test samples according to the specification in "Construction Sealing Materials," JIS-A5758, section 5.12. After these test samples had been maintained at room temperature for 14 days, the initial properties and the properties after another 7 days immersion in 20° C. water were investigated.

For comparison, composition 1(B) was used as a primer to form the same kind of test samples and the properties were investigated. Maintenance and measurement of the properties were according to the above-mentioned JIS-A5758, section 5.12. The results are shown in Table 1.

TABLE 1

| Composition B and C Test Results | | | | | | | |
|---|---|---|---|---|---|---|---|
| | | Item | | | | | |
| | | Initial | | | After Immersion in Water | | |
| Primer | Substrate | M50 | T | E | M50 | T | E |
| Composition C | Mortar Block | 1.1 | 5.2 | 790 | 1.0 | 5.0 | 650 |
| | Aluminum Panel | 1.2 | 6.2 | 900 | 1.0 | 5.4 | 970 |
| Composition B | Mortar Block | 1.2 | 2.7 | 200 | Base material and rubber peel at interface, measurement was impossible | | |
| | Aluminum Panel | 1.3 | 2.9 | 190 | Base material and rubber peel at interface, measurement was impossible | | |

Note:
M50:Tensile stress at 50% elongation (kg/cm³)
T:Breaking stress (kg/cm²)
E:Elongation at break (%)
(Same in the following examples)

EXAMPLE 2

100 g of an epoxy resin (Epikote 834, Shell Chemical Co.) with an average molecular weight of 450, hydroxyl equivalence of 105 and epoxy equivalence of 300 to 375 and 10 g of methyltrimethoxysilane, 100 g toluene and 0.15 g tetraisopropyl titanate as catalyst were placed in a 500 ml three-neck flask equipped with stirrer, reflux condenser and thermometer. With continuous stirring, the flask was heated to 100° C. gradually and a condensation reaction was carried out at reflux (105° to 110° C.). The essentially nontransparent reaction mixture gradually became transparent. Reflux was continued for 2 hours while the methyl alcohol by-product and unreacted methyltrimethoxysilane were constantly removed from the system by distillation.

The residue obtained from this reaction was a transparent liquid with a viscosity of 0.002 $M^2/s$ and contained 75 weight percent nonvolatiles. Gel permeation gas chromatography and infrared spectroscopy revealed that this nonvolatile component was a silione-modified epoxy resin containing epoxy groups and silicon-bonded methoxy groups. Adding and mixing 100 g toluene and 5 g tetra-n-butyl titanate dimer into 100 g of the above-mentioned residue gave a uniform transparent liquid (composition D). Composition D was then applied to 2 each of mortar blocks and aluminum panels (JIS-H4000) with a brush. After being dried at 20° C. for 5 hours, these blocks and panels were tested as in Example 1 according to the specifications listed in JIS-A5758, section 5.12. The initial properties and the properties after 7 days water immersion were investigated and the results are shown in Table 2.

TABLE 2

| | Composition D Test Results | | | | | |
|---|---|---|---|---|---|---|
| | Item | | | | | |
| | Initial | | | After Immersion in Water | | |
| Substrate | M50 | T | E | M50 | T | E |
| Mortar Block | 1.1 | 5.0 | 750 | 1.0 | 5.0 | 670 |
| Aluminum Panel | 1.1 | 5.3 | 750 | 1.0 | 5.3 | 870 |

EXAMPLE 3

100 g of the same epoxy resin as was used in Example 1 (Epikote 1001, Shell Chemical Co.), 250 g methyltriethoxysilane, 250 g toluene and 0.10 g tetra-n-butyl titanate were placed in a 1000 ml three-neck flask equipped with stirrer, reflux condenser and thermometer. Under continuous stirring, the flask was gradually heated to 100° C. and a condensation reaction was carried out at reflux. The essentially nontransparent reaction mixture gradually became transparent. Reflux was continued for 3 hours while the ethyl alcohol by-product and unreacted methyltriethoxysilane were constantly removed from the system by distillation.

The reaction residue contained 75 weight percent nonvolatiles. Gel permeation chromatography and infrared spectroscopy revealed that the nonvolatile component contained primarily a silicone-modified epoxy resin possessing epoxy groups and silicon-bonded ethoxy groups.

Adding and mixing 10 g of tetrabutyl titanate dimer to 100 g of this reaction residue gave a uniform transparent liquid (composition E). Composition E was then applied to 2 each of mortar blocks, aluminum panels (JIS-H4000) and stainless steel panels (SUS 304) as in Example 2 and they were dried at 20° C. for 2 hours. Experimental adhesion test samples were then produced as in Example 1 according to the specifications of JIS-A5758, section 5.12. The initial properties and properties after a 7 day water immersion were investigated and the results are shown in Table 3.

TABLE 3

| | Composition E Test Results | | | | | |
|---|---|---|---|---|---|---|
| | Item | | | | | |
| | Initial | | | After Immersion in Water | | |
| Substrate | M50 | T | E | M50 | T | E |
| Mortar Block | 1.1 | 5.1 | 750 | 1.0 | 5.0 | 640 |
| Aluminum Panel | 1.1 | 5.5 | 900 | 1.0 | 5.2 | 950 |
| Stainless Steel | 1.1 | 5.5 | 870 | 1.0 | 5.3 | 910 |

EXAMPLE 4

100 g of the epoxy resin of Example 1 (Epikote 1001, Shell Chemical Co.), 100 g gamma-mercaptopropyltrimethoxysilane, 100 g toluene and 0.15 tetraisopropylorthotitanate were placed in a 500 ml three-neck flask equipped with stirrer, reflux condenser and thermometer. With continuous stirring, the flask was heated gradually to 100° C. and a condensation reaction was carried out at reflux. The essentially nontransparent reaction mixture gradually became transparent. Refluxing was continued for 4 hours while the methyl alcohol by-product was constantly removed from the system by distillation.

The reaction residue was a transparent liquid containing 65 weight percent solids. Gel permeation gas chromatography and infrared spectroscopy revealed that this nonvolatile component was a silicone-modified epoxy resin containing epoxy groups and silicon-bonded methoxy groups. The volatile component was primarily toluene. Adding and mixing 10 g of diisopropoxytitanium bis(acetylacetonate) to 100 g of this reaction residue gave a uniform liquid (composition F). Composition F was then applied to various panels as in Example 1 and dried at 20° C. for 2 hours. The same type of experimental adhesion test samples as in Example 1 were then produced. The initial properties and those after a 7 day water immersion were investigated and the results are shown in Table 4.

TABLE 4

| | Composition F Test Results | | | | | |
|---|---|---|---|---|---|---|
| | Item | | | | | |
| | Initial | | | After Immersion in Water | | |
| Substrate | M50 | T | E | M50 | T | E |
| Stainless Steel Panel | 1.1 | 4.5 | 820 | 1.0 | 4.3 | 880 |
| Aluminum Panel | 1.2 | 5.5 | 830 | 1.0 | 5.1 | 860 |
| Acrylic Coated Panel | 1.1 | 5.3 | 870 | 1.1 | 5.0 | 870 |
| Urethane Coated Panel | 1.1 | 4.2 | 820 | 1.0 | 5.0 | 920 |
| Mortar Block | 1.1 | 5.1 | 730 | 1.0 | 2.0 | 560 |
| Tile | 1.0 | 4.8 | 810 | 1.0 | 4.7 | 970 |
| Glass Plate | 1.0 | 5.6 | 960 | 1.2 | 5.2 | 850 |

EXAMPLE 5

100 g of an allyl-terminated polyoxypropylene polymer (average molecular weight 400) were placed in an autoclave. Under nitrogen gas, 23 g of methyldimethoxysilane and 0.006 g of a platinum-ethylene catalyst complex were added followed by stirring at 100° C. for 1 hour. Then, 120 g calcium carbonate, 40 g fumed silica filler, 40 g dioctyl phthalate and 2 g dibutyltin dilaurate were added to this reaction mixture to produce a polyether type room temperature-curable rubber.

The composition E obtained in Example 3 was applied to 2 each of mortar blocks and aluminum panels with a brush and dried at room temperature for 4 hours. After that, the above-mentioned room temperature-curable rubber was applied on these experimental panels and blocks as a bead. After being maintained for 14 days, the experimental panels and blocks were checked for adhesion and it was observed that in all cases peeling occurred in the rubber layer and there was 100% cohesive failure.

EXAMPLE 6

For this example, 0.020 g of a silane with the formula $(CH_3O)_3SiCH_2CH(CH_3)CH_2SH$ were added to 7 g of a 20 weight % xylene solution of a hydroxyl-terminated polybutadiene with a molecular weight appropriate for curing to a rubber. After heating at 100° C. for 24 hours, an alkoxysilyl-terminated polybutadiene was formed. To this modified polybutadiene were added 0.163 g methyltrimethoxysilane and 0.082 g titanium acetonylacetate to produce a room temperature-curable rubber. Composition E of Example 3 was applied to 2 each of mortar blocks and aluminum panels with a brush. These blocks and panels were dried at 20° C. for 4 hours. The above-mentioned room temperature-curable rubber was then applied to these plates as a bead. After being maintained for 14 days, these experimental blocks and panels were checked for adhesion and it was observed that in all cases peeling occurred in the rubber layer and there was 100% cohesive failure.

EXAMPLE 7

An oxime-liberating single package silicone sealant (SH780 Sealant by Toray Silicone Co., Ltd.) and an alcohol-liberating single package silicone sealant (SH9145 Sealant by Toray Silicone Co., Ltd.) were used as room temperature-curable silicone rubbers. Composition C of Example 1 was used as the primer composition. The adhesion was tested under the same conditions as in Example 6 and identical results were obtained.

Coating Composition Examples

EXAMPLE 8

A condensation reaction was carried out using Epikote 1001 ® by Shell Chemical Corporation and methyltrimethoxysilane for the compositions shown in Table 5. In this case, tetrabutyl titanate was added as the condensation reaction accelerating catalyst and toluene was used as the solvent. These components were placed in a three-neck flask equipped with a reflux condenser, thermometer and stirrer. A reaction was carried out at 90° C. under reflux for 5 hours. After the reaction, low boiling fractions were removed by distillation and the mixture was then cooled. A light yellow, transparent silicone-modified epoxy resin containing silicon-bonded methoxy groups was obtained as a result. Tetrabutyl titanate (2 parts) was added to 20 parts of the resin produced above. This is sample 1. In the case of sample 3 which used sample 1 with a methoxy group/hydroxyl group ratio of less than 1, gelation occurred immediately. In the case of sample 4 which used sample 2 in which the same ratio was 6.9, thickening was not observed. When sample 4 was stored in a sealed glass bottle, a homogeneous liquid was maintained after 3 months. The composition of sample 4 into which tetrabutyl titanate was compounded was coated over a stainless steel plate. The coated surface was no longer tacky after 10 minutes. The coated film adhered well on the stainless steel plate.

TABLE 5

| Compositions of Silicone-Modified Epoxy Resins | | |
|---|---|---|
| Component | Sample No. 1 Parts | Sample No. 2 Parts |
| Epikote ® 1001 (hydroxyl group equivalents) | 45.5 (0.1456) | 25.0 (0.080) |
| Methyltrimethoxysilane ($OCH_3$ group equivalent) | 4.5 (0.0993) | 25.0 (0.5515) |
| Tetrabutyl titanate | 0.01 | 0.01 |
| Toluene | 50.0 | 50.0 |
| TOTAL | 100.01 | 100.01 |

| Results of Evaluation and Compositions of the Coating Compositions | | |
|---|---|---|
| | 3 | 4 |
| Component | Comparison Example | This Invention |
| [$OCH_3$ group equivalents] | 0.68 Parts | 6.9 Parts |
| Resin 1 | 20 | 0 |
| Resin 2 | 0 | 20 |
| Tetrabutyl titanate | 2 | 2 |
| Stability | Gelation Occurred Immediately | No Abnormalities |
| Finger touch drying (Note 3) | — | 10 minutes |

Note 3:
Time in which the coated surface was no longer tacky and fingerprints were no longer present.

EXAMPLE 9

Epikote 1001 ® by Shell Chemical Corporation (hydroxyl group equivalents: 1.44) (450 parts), methyltrimethoxysilane (1050 parts)(methoxyl group equivalents: 23.2) and tetrabutyl titanate (0.1 part) were placed in a three-neck 2000 ml flask. The system was gradually heated to reflux. Reflux was achieved at about 88° C. The reaction was carried out under reflux for 5 hours. After the reaction, low boiling fractions (108 parts) were removed by distillation and a light yellow, transparent silicone-modified epoxy resin I containing silicon-bonded methoxy groups with a nonvolatile fraction of 37.7% was obtained resulting in a yield of 1,390 parts. On the basis of the solids content, the silicone content in the silicone-modified epoxy resin was calculated to be approximately 14 weight percent. In this case, the volatile fraction in the residue was methyltrimethoxysilane and tetrabutyl titanate were compounded as shown in Table 6 to prepare five compositions. These compositions were respectively coated over a stainless steel panel (SUS 304), a methacrylic resin panel and a polycarbonate panel. The finger touch drying time, adhesiveness after curing for 48 hours (cross-cut adhesion test) and pencil hardness were evaluated. The results are presented in Table 6. As shown in Table 6, when too little tetrabutyl titanate was added, drying required too many hours. When too much was added, the coated film became brittle and cracks were easily produced. The adhesion on the methacrylic resin panel and stainless steel panel were found to be impaired.

TABLE 6

| Results On Evaluation and Composition of the Coatings | | | | | |
|---|---|---|---|---|---|
| Components | 5 Comparison* Example | 6 This Invention | 7 This Invention | 8 Comparison* Example | 9 Comparison* Example |
| Silicone-modified epoxy resin I (solids content) | 100 parts | 100 parts | 100 parts | 100 parts | 100 parts |
| Methyltrimethoxy- | 130 | 130 | 130 | 130 | 130 |

TABLE 6-continued

| | Results On Evaluation and Composition of the Coatings | | | | |
|---|---|---|---|---|---|
| silane | | | | | |
| Tetrabutyl | 0.03 | 27 | 80 | 130 | 260 |
| titanate | | | | | |
| TOTAL | 230.03 | 257 | 310 | 360 | 490 |

| Components | 5 Comparison Example | 6 This Invention | 7 This Invention | 8 Comparison Example | 9 Comparison Example |
|---|---|---|---|---|---|
| Film Appearance | No Abnormalities | No Abnormalities | No Abnormalities | No Abnormalities | Cracks covered whole surface |
| Finger touch drying time (min.) | 120 | 10 | 10 | 10 | |
| Adhesion | | | | | |
| Stainless Steel Panel | — | 100/100 | 100/100 | 75/100 | 0/100 |
| Methacrylic Resin Panels | — | 100/100 | 100/100 | 5/100 | 0/100 |
| Polycarbonate Resin Panels | — | 100/100 | 100/100 | 100/100 | 0/100 |
| Pencil hardness | — | HB | HB | HB | — |

*Outside the scope of this invention

EXAMPLE 10

A coating composition was prepared by compounding methyltrimethoxysilane (260 parts) and tetrabutyl titanate (26 parts) in 100 parts (solid content) of silicone-modified epoxy resin I. The resulting composition was coated over various base materials as shown in Table 7 and cured by allowing the film to stand at room temperature for 48 hours. The adhesiveness with these base materials and the film hardness were examined. The results are presented in Table 7.

TABLE 7

| Adhesion on Various Substrates | | |
|---|---|---|
| Base Materials | Adhesiveness (Cross-cut Adhesion Test) | Pencil Hardness |
| Aluminum panel (JISH4000 A1050P) | 100/100 | HB |
| Aluminum panel (JISH4000 A1050P) (sealed by alumite sulfate treatment) | 100/100 | HB |
| Aluminum panel (JISH400 A1050P) (nonsealing by alumite sulfate treatment) | 100/100 | HB |
| Aluminum panel (JISH4000 A6061S) | 100/100 | H |
| Aluminum panel (baked with an acrylic resin) | 100/100 | H |
| Aluminum panel (V-Chroma treatment (note below) | 100/100 | H |
| Stainless steel panel (SUS 304) | 100/100 | H |
| Soft steel panel | 100/100 | H |
| Polycarbonate resin panel | 100/100 | H |
| Methacrylic resin panel | 100/100 | H |
| Vinyl chloride panel | 100/100 | HB |

Note: A single-liquid polyurethane resin paint for curtain walls (by DaiNippon Toryo K.K.) was used.

EXAMPLE 11

(1) Preparation of a silicone-modified epoxy resin II

Methyltrimethoxysilane was hydrolyzed and condensed in the presence of an acid catalyst and low boiling fractions were removed by distillation. Methylmethoxypolysiloxane (144 parts, methoxy group equivalent 1.39) containing 30 weight percent methoxy groups and with a viscosity at 25° C. of 0.000042 M²/s, Epikote 1001 ® by Shell Chemical Corporation (576 parts, OH group equivalent 1.84), tetrabutyl titanate (0.2 parts) and toluene (1080 parts) were placed in a 2000 ml three-neck flask equipped with a stirrer, reflux condenser and thermometer. The temperature was slowly raised to 105° C. While the methanol produced at this temperature was removed by distillation, the mixture was continuously stirred. The reaction was continued until compatability was obtained (compatability was judged to be the point at which a sample, taken every hour, formed a transparent film on glass when the sample on the glass plate was devolatized). After compatability had been obtained, low boiling fractions (300 ml) were removed by distillation. The temperature was subsequently reduced to 80° C. When the temperature reached 80° C. or less, methyltrimethoxysilane (130 parts, methoxy group equivalent 3.03) was added. The ratio of total methoxy equivalents/hydroxyl equivalents was 2.4. The mixture was slowly heated and a reaction was carried out at reflux for 6 hours. After the reaction, the mixture was cooled and a transparent liquid silicone-modified epoxy resin II was obtained with a nonvolatile content of 43%.

(2) Preparation of coating compositions and adhesion testing on various substrates Methyltrimethoxysilane (230 parts) and tetrabutyl titanate or diisopropoxytitanium bis(acetylacetonate) (24 parts) were compounded with 100 parts (solid content) of silicone-modified resin II. The resulting composition was coated onto a stainless steel panel, a soft steel panel, polycarbonate resin panel and methacrylic resin panel and cured by allowing the coated film to stand at room temperature for 48 hours. The adhesion was examined by the cross-cut adhesion test. The results were 100/100. Thus, the above-mentioned coating composition exhibited excellent adhesion. The composition had not thickened after storage in a glass bottle at room temperature after 3 months.

That which is claimed is:

1. A method of bonding a room temperature curable rubber coating to a solid substrate which comprises
(I) contacting a solid substrate with a room temperature curable primer composition comprising
   (A) 100 parts by weight of a silicone modified epoxy resin which contains both epoxy groups and silicon-bonded alkoxy groups wherein the modified epoxy resin is obtained by contacting and reacting
      (a) a compound having the unit formula

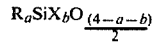

wherein R is a substituted or unsubstituted monovalent hydrocarbon radical, X is an alkoxy radical having the formula R'O— wherein R' is an alkyl radical of 1 to 4 carbon atoms or the radical $R^2OR^3$— wherein $R^2$ is an alkyl radical of 1 to 4 carbon atoms and $R^3$ is a divalent alkylene radical of 1 to 3 carbon atoms; a has a value of 0 to 2; b has a value of 1 to 4 and the sum of a+b has a value of 1 to 4, with
      (b) an epoxy resin containing at least one epoxy group and at least one hydroxy group per molecule; and
   (B) 0.1 to 100 parts by weight of an organotitanium acid ester, and
(II) allowing said primer to air dry
(III) surmounting the air dried primer with a room temperature curable rubber, and
(IV) allowing the room temperature curable rubber to cure whereby the room temperature curable rubber is bonded to the solid substrate.

2. A method as claimed in claim 1 wherein in the primer, there is present 5 to 25 parts by weight of component (B) for 100 parts of component (A).

3. A method as claimed in claim 1 wherein in the primer, component (B) is a titanium chelate.

4. A method as claimed in claim 3 wherein in the primer, the titanium chelate is a beta-diketone chelate of dialkoxytitanium compounds.

5. A method as claimed in claim 3 wherein in the primer, the titanium chelate is a ketoacid ester chelate of dialkoxytitanium compounds.

6. A method as claimed in claim 1 wherein the room temperature curable rubber is silicone rubber.

7. A method as claimed in claim 1 wherein the room temperature curable rubber is a silicone-modified organic rubber.

8. A method of bonding a room temperature curable rubber coating to a solid substrate which comprises
(I) contacting a solid substrate with a room temperature curable primer composition comprising
   (A) 100 parts by weight of a silicone modified epoxy resin which contains both epoxy groups and silicon-bonded alkoxy groups wherein the modified epoxy resin is obtained by contacting and reacting
      (a) a compound having the unit formula

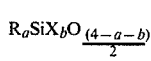

wherein R is a substituted or unsubstituted monovalent hydrocarbon radical, X is an alkoxy radical having the formula R'O— wherein R' is an alkyl radical of 1 to 4 carbon atoms or the radical $R^2OR^3$— wherein $R^2$ is an alkyl radical of 1 to 4 carbon atoms and $R^3$ is a divalent alkylene radical of 1 to 3 carbon atoms; a has a value of 0 to 2; b has a value of 1 to 4 and the sum of a+b has a value of 1 to 4, with
      (b) an epoxy resin containing at least one epoxy group and at least one hydroxy group per molecule; and
   (B) 0.1 to 100 parts by weight of an organotitanium acid ester, and
(II) allowing said primer to cure;
(III) surmounting the cured primer with a room temperature curable rubber, and
(IV) allowing the room temperature curable rubber to cure whereby the room temperature curable rubber is bonded to the solid substrate.

9. A method as claimed in claim 8 wherein in the primer, there is present 5 to 25 parts by weight of component (B) for 100 parts of component (A).

10. A method as claimed in claim 8 wherein in the primer, component (B) is a titanium chelate.

11. A method as claimed in claim 10 wherein in the primer, the titanium chelate is a beta-diketone chelate of dialkoxytitanium compounds.

12. A method as claimed in claim 10 wherein in the primer, the titanium chelate is a ketoacid ester chelate of dialkoxytitanium compounds.

13. A method as claimed in claim 8 wherein the room temperature curable rubber is silicone rubber.

14. A method as claimed in claim 8 wherein the room temperature curable rubber is a silicone-modified organic rubber.

15. A method of bonding a room temperature curable rubber coating to a solid substrate which comprises
(I) contacting a solid substrate with a room temperature curable primer composition comprising
   (A) 100 parts by weight of a silicone modified epoxy resin which contains both epoxy groups and silicon-bonded alkoxy groups wherein the modified epoxy resin is obtained by contacting and reacting
      (a) a compound having the unit formula

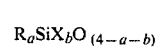

wherein R is a substituted or unsubstituted monovalent hydrocarbon radical, X is an alkoxy radical having the formula R'O— wherein R' is an alkyl radical of 1 to 4 carbon atoms or the radical $R^2OR^3$— wherein $R^2$ is an alkyl radical of 1 to 4 carbon atoms and $R^3$ is a divalent alkylene radical of 1 to 3 carbon atoms; a has a value of 0 to 2; b has a value of 1 to 4 and the sum of a+b has a value of 1 to 4, with
      (b) an epoxy resin containing at least one epoxy group and at least one hydroxy group per molecule; and
   (B) 0.1 to 100 parts by weight of an organotitanium acid ester, and
(II) allowing said primer to air dry;
(III) curing said primer;
(IV) Surmounting the cured primer with a room temperature curable rubber, and
(V) allowing the room temperature curable rubber to cure whereby the room temperature curable rubber is bonded to the solid substrate.

16. A method as claimed in claim 15 wherein in the primer, there is present 5 to 25 parts by weight of component (B) for 100 parts of component (A).

17. A method as claimed in claim 15 wherein in the primer, component (B) is a titanium chelate.

18. A method as claimed in claim 17 wherein in the primer, the titanium chelate is a beta-diketone chelate of dialkoxytitanium compounds.

19. A method as claimed in claim 17 wherein in the primer, the titanium chelate is a ketoacid ester chelate of dialkoxytitanium compounds.

20. A method as claimed in claim 15 wherein the room temperature curable rubber is silicone rubber.

21. A method as claimed in claim 15 wherein the room temperature curable rubber is a silicone-modified organic rubber.

* * * * *